US012621647B2

(12) United States Patent
Zhong

(10) Patent No.: US 12,621,647 B2
(45) Date of Patent: May 5, 2026

(54) TERMINAL ROAMING GUIDANCE METHOD, ELECTRONIC DEVICE, AND STORAGE MEDIUM

(71) Applicant: RUIJIE NETWORKS CO., LTD., Fuzhou (CN)

(72) Inventor: Zhaowei Zhong, Fuzhou (CN)

(73) Assignee: RUIJIE NETWORKS CO., LTD., Fuzhou (CN)

( * ) Notice: Subject to any disclaimer, the term of this patent is extended or adjusted under 35 U.S.C. 154(b) by 0 days.

(21) Appl. No.: 19/247,346

(22) Filed: Jun. 24, 2025

(65) Prior Publication Data

US 2025/0324231 A1 Oct. 16, 2025

Related U.S. Application Data

(63) Continuation of application No. PCT/CN2024/086124, filed on Apr. 3, 2024.

(30) Foreign Application Priority Data

May 31, 2023 (CN) .......................... 202310636473.X

(51) Int. Cl.
$H04W\ 8/08$ (2009.01)
$H04W\ 24/02$ (2009.01)
$H04W\ 36/32$ (2009.01)

(52) U.S. Cl.
CPC ............. *H04W 8/08* (2013.01); *H04W 24/02* (2013.01)

(58) Field of Classification Search
CPC ....... H04W 24/02; H04W 8/08; H04W 36/32; H04W 36/008; H04W 84/12
See application file for complete search history.

(56) References Cited

U.S. PATENT DOCUMENTS

| | | | |
|---|---|---|---|
| 12,262,446 B2 * | 3/2025 | Grayson ................. | H04W 8/12 |
| 12,425,833 B2 * | 9/2025 | Sukojo .................... | H04W 8/18 |
| 2004/0018851 A1 | 1/2004 | Koenck et al. | |

(Continued)

FOREIGN PATENT DOCUMENTS

| | | |
|---|---|---|
| CN | 103999511 A | 8/2014 |
| CN | 106550348 A | 3/2017 |

(Continued)

OTHER PUBLICATIONS

International Search Report and Written Opinion issued on Jun. 19, 2024, in corresponding International Application No. PCT/CN2024086124, 10 pages.

(Continued)

*Primary Examiner* — Khawar Iqbal
(74) *Attorney, Agent, or Firm* — Maier & Maier, PLLC

(57) ABSTRACT

A terminal roaming guidance method, an electronic device, and a storage medium. The method includes: obtaining historical roaming data of a target terminal under a first target roaming policy, and determining a roaming evaluation result of the target terminal based on the historical roaming data; if the roaming evaluation result does not meet an expected requirement, adjusting a policy parameter in the first target roaming policy until the expected requirement is met, to obtain a second target roaming policy of the target terminal; and guiding the target terminal to roam to a target AP in the AP network environment based on the second target roaming policy.

20 Claims, 2 Drawing Sheets

(56) References Cited

U.S. PATENT DOCUMENTS

| | | | | |
|---|---|---|---|---|
| 2013/0095828 A1* | 4/2013 | Hursey | | H04W 8/04 |
| | | | | 455/433 |
| 2015/0333958 A1 | 11/2015 | Xu et al. | | |
| 2016/0255549 A1 | 9/2016 | Lakhdhar et al. | | |
| 2017/0223621 A1* | 8/2017 | Tan | | H04W 60/00 |
| 2023/0014083 A1 | 1/2023 | Wei et al. | | |
| 2023/0021642 A1* | 1/2023 | Grayson | | H04W 8/26 |
| 2024/0155324 A1* | 5/2024 | Wang | | H04W 8/12 |
| 2024/0223252 A1* | 7/2024 | Smith | | H04W 8/22 |
| 2024/0244141 A1* | 7/2024 | Chai | | H04W 4/24 |
| 2024/0314578 A1* | 9/2024 | Henry | | H04W 36/00835 |
| 2024/0323667 A1* | 9/2024 | Sukojo | | H04W 8/18 |
| 2024/0381066 A1* | 11/2024 | Barton | | H04W 8/02 |
| 2024/0397441 A1* | 11/2024 | Dasgupta | | H04W 8/02 |
| 2025/0071566 A1* | 2/2025 | Tao | | H04B 17/327 |
| 2025/0168617 A1* | 5/2025 | Nix | | H04W 8/02 |

FOREIGN PATENT DOCUMENTS

| | | | |
|---|---|---|---|
| CN | 110868740 A | 3/2020 |
| CN | 113596898 A | 11/2021 |
| CN | 114189924 A | 3/2022 |
| CN | 115734301 A | 3/2023 |
| CN | 115835251 A | 3/2023 |
| CN | 115988476 A | 4/2023 |
| WO | 2023017036 A1 | 2/2023 |

OTHER PUBLICATIONS

Office Action issued on Oct. 12, 2025, in corresponding Chinese Application No. 202310636473.X, 12 pages.
Extended Search Report issued on Jan. 26, 2026, in corresponding European Application No. 24813895.0, 16 pages.

* cited by examiner

TERMINAL ROAMING GUIDANCE METHOD, ELECTRONIC DEVICE, AND STORAGE MEDIUM

CROSS-REFERENCE TO RELATED APPLICATIONS

This application is a continuation of International Patent Application No. PCT/CN2024/086124 filed on Apr. 3, 2024, which claims priority to Chinese Patent Application No. 202310636473. X, filed with the China National Intellectual Property Administration on May 31, 2023 and entitled "TERMINAL ROAMING GUIDANCE METHOD AND APPARATUS, ELECTRONIC DEVICE, AND STORAGE MEDIUM", which are incorporated herein by reference in their entireties.

TECHNICAL FIELD

This application relates to the field of network communication technologies, and in particular, to a terminal roaming guidance method, an electronic device, and a storage medium.

BACKGROUND

In a wireless communication network, a terminal device can always maintain network communication within signal coverage of a wireless access point (AP). However, because signal coverage of a single AP device (also known as a service area of the AP) is limited, the terminal device usually crosses from a service area of one AP to a service area of another AP during movement.

To avoid an interruption of network communication of the terminal device when the terminal device is handed over between different APs, a wireless roaming technology is introduced for terminal devices. Wireless roaming means that when a terminal device moves to a critical area within coverage areas of two APs, the terminal device is associated with a new AP and disassociated from an original AP (an AP initially associated with). In this process, the terminal device maintains an uninterrupted network connection. This wireless roaming mode needs to be aggressively initiated by the terminal device.

However, some terminal devices with poor roaming aggressiveness (for example, low-end mobile phones and tablets and the like) may stick to an AP that they are originally associated with, and may not roam to an AP with high signal quality even if they are far away from the AP that they are originally associated with and their signals are weak as the terminal device moves. This type of terminal device may be referred to as a sticky terminal device.

This type of sticky terminal device cannot implement autonomous roaming relying on the terminal device itself. In this case, emergence of an intelligent roaming mode resolves this problem well. The intelligent roaming mode can guide the terminal device to roam in a way that the terminal device can understand. Compared with autonomous roaming of the terminal device, this mode is more intelligent.

SUMMARY

Exemplary embodiments of this application provide a terminal roaming guidance method, an electronic device, and a storage medium.

According to a first aspect, a terminal roaming guidance method is provided and includes:

obtaining historical roaming data of a target terminal under a first target roaming policy, and determining a roaming evaluation result of the target terminal based on the historical roaming data, where the first target roaming policy is a roaming policy assigned based on a network profile library in a wireless access point AP network environment when the target terminal enters the AP network environment;

if the roaming evaluation result does not meet an expected requirement, adjusting a policy parameter in the first target roaming policy until the expected requirement is met, to obtain a second target roaming policy of the target terminal, where the expected requirement represents an optimal occasion for the target terminal to execute an optimal roaming policy; and guiding the target terminal to roam to a target AP in the AP network environment based on the second target roaming policy, where the target AP is a target AP in the second target roaming policy.

In a possible embodiment, the AP network environment includes N APs and is configured with a terminal profile library, the terminal profile library includes roaming policies of one or more types of terminals in the N APs, and N is an integer greater than 0; and before the obtaining the historical roaming data of the target terminal under the first target roaming policy, the method further includes:

determining a terminal type of the target terminal; and if a first terminal matching the terminal type is found in the terminal profile library based on the terminal type of the target terminal, using a roaming policy in a first AP that the first terminal is currently associated with among the N APs as the first target roaming policy of the target terminal.

In a possible embodiment, configuring the terminal profile library in the AP network environment includes:

determining whether a first network profile that meets a similarity requirement with an AP network profile of the AP network environment exists in the network profile library; and if the first network profile exists, reusing the terminal profile library corresponding to the first network profile for the AP network environment.

In a possible embodiment, the method further includes:

if the first terminal matching the terminal type is not found in the terminal profile library based on the terminal type of the target terminal, determining an initial roaming policy of the target terminal based on mutual scanning information of the N APs in the AP network environment and roaming information of the target terminal, and using the initial roaming policy of the target terminal as the first target roaming policy of the target terminal, where the roaming information of the target terminal includes one or more pieces of the following information: signal strength information, roaming time, channel utilization, a quantity of uplink bytes, a quantity of downlink bytes, a packet loss rate, or a physical rate.

In a possible embodiment, the terminal profile includes one or more pieces of the following information: a network communication capability of the terminal during roaming, a terminal name, a terminal identity, a terminal type, or roaming policies used when the terminal roams in the N APs respectively.

In a possible embodiment, the determining the terminal type of the target terminal includes one or more of the following:

determining the terminal type of the target terminal by identifying a media access control address;

determining the terminal type of the target terminal based on a hypertext transfer protocol HTTP initiated by the target terminal; and determining the terminal type of the target terminal based on attribute information of the target terminal.

In a possible embodiment, the method further includes:

obtaining network information of N APs in the AP network environment, where N is an integer greater than 0;

determining network environment characteristics of the AP network environment based on the network information of the N APs; and constructing an AP network profile of the AP network environment based on the network environment characteristics of the AP network environment, and storing the AP network profile in the network profile library.

In a possible embodiment, the determining the network environment characteristics of the AP network environment based on the network information of the N APs includes one or more of the following:

determining the network environment characteristics of the AP network environment based on coverage information in the network information of the N APs;

determining the network environment characteristics of the AP network environment based on distribution information in the network information of the N APs;

determining the network environment characteristics of the AP network environment based on drop-point areas in the network information of the N APs; and determining the network environment characteristics of the AP network environment based on mutual scanning information in the network information of the N APs.

In a possible embodiment, the method further includes:

obtaining mutual scanning information of M APs in a new AP network environment, where M is an integer greater than 0; ranking the M APs by importance based on the mutual scanning information of the M APs;

constructing a mutual scanning matrix of the new AP network environment based on mutual scanning signal strength values of the M APs in the importance ranking;

generating a new AP network profile of the new AP network environment based on the mutual scanning matrix of the new AP network environment; and if the new AP network profile of the new AP network environment meets a similarity requirement with the AP network profile of the AP network environment in the network profile library, reusing the terminal profile library in the AP network environment for the new AP network environment.

In a possible embodiment, the method further includes:

if the new AP network profile of the new AP network environment does not meet the similarity requirement with the AP network profile in the network profile library, adding the new AP network profile to the network profile library.

In a possible embodiment, the ranking the M APs by importance based on the mutual scanning information of the M APs includes:

performing the importance ranking based on the mutual scanning signal strength values of the M APs, where the greater a mutual scanning signal strength value, the higher the importance; or performing the importance ranking based on frequencies of the M APs, where the higher a frequency, the higher the importance.

In a possible embodiment, the obtaining the historical roaming data of the target terminal under the first target roaming policy includes:

obtaining historical roaming data of the target terminal within a preset time period under the first target roaming policy; or obtaining a preset quantity of pieces of historical roaming data of the target terminal under the first target roaming policy; or obtaining all pieces of historical roaming data of the target terminal under the first target roaming policy.

In a possible embodiment, the historical roaming data includes one or more of the following: signal strength, an uplink physical rate, a downlink physical rate, a quantity of uplink bytes, a quantity of downlink bytes, and a packet loss rate of the target terminal under the first target roaming policy; and the determining the roaming evaluation result of the target terminal based on the historical roaming data includes:

determining, based on historical roaming data before and after the target terminal executes the first target roaming policy, whether communication performance of the target terminal meets a specified expected requirement, where the expected requirement represents suitability of a roaming behavior of the target terminal.

In a possible embodiment, the whether the communication performance of the target terminal meets the specified expected requirement includes:

if one piece of the historical roaming data does not meet a corresponding specified threshold, determining that the communication performance of the target terminal does not meet the specified expected requirement after the target terminal roams by using the first target roaming policy.

In a possible embodiment, the adjusting the policy parameter in the first target roaming policy until the expected requirement is met includes:

based on a selected first roaming action performed by the target terminal in a current first roaming state, obtaining an expected reward and a second roaming state at a next time point;

determining, based on a Q-function, a second roaming action to be performed by the target terminal in the second roaming state; and updating the Q-function based on the second roaming state, the second roaming action, and the expected reward until an updated Q-function meets the expected requirement, where the Q-function meets the following expression: $Q(s,a)=Q(s,a)+\alpha(r+\gamma Q(s',a')-Q(s,a))$, where s is the first roaming state, a is the first roaming action, r is the expected reward, $\alpha$ is a specified learning rate, $\gamma$ is a specified discount rate, s' is the second roaming state, and a' is the second roaming action.

According to a second aspect, a terminal roaming guidance method is provided and includes:

obtaining historical roaming data of a target terminal under a first target roaming policy, and determining a roaming evaluation result of the target terminal based on the historical roaming data, where the first target roaming policy is a roaming policy assigned when the target terminal enters an AP network environment; if the roaming evaluation result does not meet an expected requirement, adjusting a policy parameter in the first target roaming policy until the expected requirement is met, to obtain a second target roaming policy of the target terminal; and guiding the target terminal to roam to a target AP in the AP network environment based on the second target roaming policy.

In an embodiment, the AP network environment includes N APs and a terminal profile library, the terminal profile library includes a roaming policy of at least one type of terminal in the N APs, and N is an integer greater than 0; and before the obtaining the historical roaming data of the target terminal under the first target roaming policy, the method further includes:

identifying a terminal type of the target terminal; if a first terminal matching the terminal type is found in the terminal profile library based on the terminal type of the target terminal, using a roaming policy in a first AP that the first terminal is currently associated with among the N APs as the first target roaming policy of the target terminal; and if the first terminal matching the terminal type is not found in the terminal profile library based on the terminal type of the target terminal, determining an initial roaming policy of the target terminal based on mutual scanning information of the N APs in the AP network environment and roaming information of the target terminal, and using the initial roaming policy of the target terminal as the first target roaming policy of the target terminal.

In this embodiment of this application, based on the constructed terminal profile library, the target terminal newly connected to the network can reuse the roaming policy of the terminal of the same type, thereby increasing a roaming speed.

In an embodiment, the method further includes:

obtaining network information of N APs in the AP network environment, where N is an integer greater than 0; determining network environment characteristics of the AP network environment based on the network information of the N APs; and constructing an AP network profile of the AP network environment based on the network environment characteristics of the AP network environment, and storing the AP network profile in a network profile library.

In this embodiment of this application, various AP network environments can be summarized and distinguished by constructing the foregoing network profile library. When a new AP network environment is subsequently constructed, a roaming policy of a similar AP network environment can be reused based on the network profile library. Therefore, a process of redefining a roaming policy can be omitted, and roaming experience can be optimized.

In an embodiment, the determining the network environment characteristics of the AP network environment based on the network information of the N APs includes:

determining the network environment characteristics of the AP network environment based on coverage information in the network information of the N APs; or determining the network environment characteristics of the AP network environment based on distribution information in the network information of the N APs; or determining the network environment characteristics of the AP network environment based on drop-point areas in the network information of the N APs.

In this embodiment of this application, the network environment characteristics of the AP network environment can be extracted from multiple dimensions, so that the subsequently constructed network profile library is more accurate.

In an embodiment, the method further includes:

obtaining mutual scanning information of M APs in a new AP network environment, where M is an integer greater than 0; ranking the M APs by importance based on the mutual scanning information of the M APs; constructing a mutual scanning matrix of the new AP network environment based on mutual scanning signal strength values of the M APs in the importance ranking; generating a new AP network profile of the new AP network environment based on the mutual scanning matrix of the new AP network environment; and if the new AP network profile of the new AP network environment meets a similarity requirement with the AP network profile of the AP network environment in the network profile library, reusing the terminal profile library in the AP network environment for the new AP network environment.

In this embodiment of this application, during construction of the AP network environment, fast cold start can be implemented based on the network profile library.

In an embodiment, the adjusting the policy parameter in the first target roaming policy until the expected requirement is met includes:

based on a selected first roaming action performed by the target terminal in a first roaming state, obtaining an expected reward and a second roaming state at a next time point; determining, based on a Q-function, a second roaming action to be performed by the target terminal in the second roaming state; and updating the Q-function based on the second roaming state, the second roaming action, and the expected reward until an updated Q-function meets the expected requirement, where the Q-function meets the following expression: $Q(s,a)=Q(s,a)+\alpha(r+\gamma Q(s^\wedge{}', a^\wedge{}')-Q(s,a))$, where s is the first roaming state, a is the first roaming action, r is the expected reward, $\alpha$ is a specified learning rate, $\gamma$ is a specified discount rate, s' is the second roaming state, and a' is the second roaming action.

According to a third aspect, a terminal roaming guidance apparatus is provided and includes:

an evaluation module, configured to obtain historical roaming data of a target terminal under a first target roaming policy, and determine a roaming evaluation result of the target terminal based on the historical roaming data, where the first target roaming policy is a roaming policy assigned when the target terminal enters an AP network environment; an adjustment module, configured to adjust, if the roaming evaluation result does not meet an expected requirement, a policy parameter in the first target roaming policy until the expected requirement is met, to obtain a second target roaming policy of the target terminal; and a guidance module, configured to guide the target terminal to roam to a target AP in the AP network environment based on the second target roaming policy.

In an embodiment, the AP network environment includes N APs and a terminal profile library, the terminal profile library includes a roaming policy of at least one type of terminal in the N APs, and Nis an integer greater than 0; and the apparatus further includes an assignment module, where the assignment module is specifically configured to:

identify a terminal type of the target terminal; if a first terminal matching the terminal type is found in the terminal profile library based on the terminal type of the target terminal, use a roaming policy in a first AP that the first terminal is currently associated with among the N APs as the first target roaming policy of the target terminal; and if the first terminal matching the terminal type is not found in the terminal profile library based on the terminal type of the target terminal, determine an initial roaming policy of the target terminal based on mutual scanning information of the N APs in the AP network environment and roaming information of the target terminal, and use the initial roaming policy of the target terminal as the first target roaming policy of the target terminal.

In an embodiment, the apparatus further includes a network image construction module, where the network image construction module is configured to: obtain network information of N APs in the AP network environment, where N is an integer greater than 0; determine network environment characteristics of the AP network environment based on the network information of the N APs; and construct an AP network profile of the AP network environment based on the network environment characteristics of the AP network environment, and store the AP network profile in a network profile library.

In an embodiment, the network image construction module is specifically configured to:

determine the network environment characteristics of the AP network environment based on coverage information in the network information of the N APs; or determine the network environment characteristics of the AP network environment based on distribution information in the network information of the N APs; or determine the network environment characteristics of the AP network environment based on drop-point areas in the network information of the N APs.

In an embodiment, the network image construction module is further configured to: obtain mutual scanning information of M APs in a new AP network environment, where M is an integer greater than 0; rank the M APs by importance based on the mutual scanning information of the M APs; construct a mutual scanning matrix of the new AP network environment based on mutual scanning signal strength values of the M APs in the importance ranking; generate a new AP network profile of the new AP network environment based on the mutual scanning matrix of the new AP network environment; and if the new AP network profile of the new AP network environment meets a similarity requirement with the AP network profile of the AP network environment in the network profile library, reuse the terminal profile library in the AP network environment for the new AP network environment.

According to a fourth aspect, an electronic device is provided and includes:

a memory, configured to store a computer program; and a processor, configured to execute the computer program stored in the memory, to implement the steps of the method according to the first aspect or the second aspect.

According to a fifth aspect, a computer-readable storage medium is provided. A computer program is stored in the computer-readable storage medium. When the computer program is executed by a processor, the steps of the method according to the first aspect or the second aspect are implemented.

In the embodiments of this application, because the historical roaming data of the target terminal under the first target roaming policy is obtained for analysis, and the first target roaming policy is the roaming policy assigned when the target terminal enters the AP network environment, it is determined whether the roaming of the target terminal using the first target roaming policy meets the expected requirement. If the expected requirement is not met, the policy parameter in the first target roaming policy is optimized, and then the target terminal is guided to roam. Therefore, compared with using a threshold to guide a terminal device to roam, differences between different terminal devices are taken into account, and roaming policies used for different terminal devices can be adaptively adjusted in the roaming process to maximize roaming benefits, thereby improving applicability of the terminal device during roaming.

For any one of the third aspect to the fifth aspect and technical effects that can be achieved in the aspects, refer to descriptions of technical effects that can be achieved in various possible solutions in the first aspect or the second aspect. Details are not described herein again.

Other features and advantages of this application will be set forth later in the specification, and in part will be readily apparent from the specification, or may be understood by implementing this application. Objectives and other advantages of this application may be achieved and obtained by using a structure particularly stated in the written specification, claims, and accompanying drawings.

BRIEF DESCRIPTION OF DRAWINGS

To describe the technical solutions in the embodiments of this application or in the prior art more clearly, the following briefly describes the accompanying drawings required for describing the embodiments or the prior art. Apparently, the accompanying drawings in the following description show merely some of the embodiments of the present invention, and a person of ordinary skill in the art may still derive other drawings of embodiments from these accompanying drawings without creative efforts.

The accompanying drawings described herein are intended for better understanding of this application, and constitute a part of this application. Exemplary embodiments and descriptions thereof in this application are intended to interpret this application and do not constitute any improper limitation on this application.

DETAILED DESCRIPTION OF EMBODIMENTS

Figure 1:
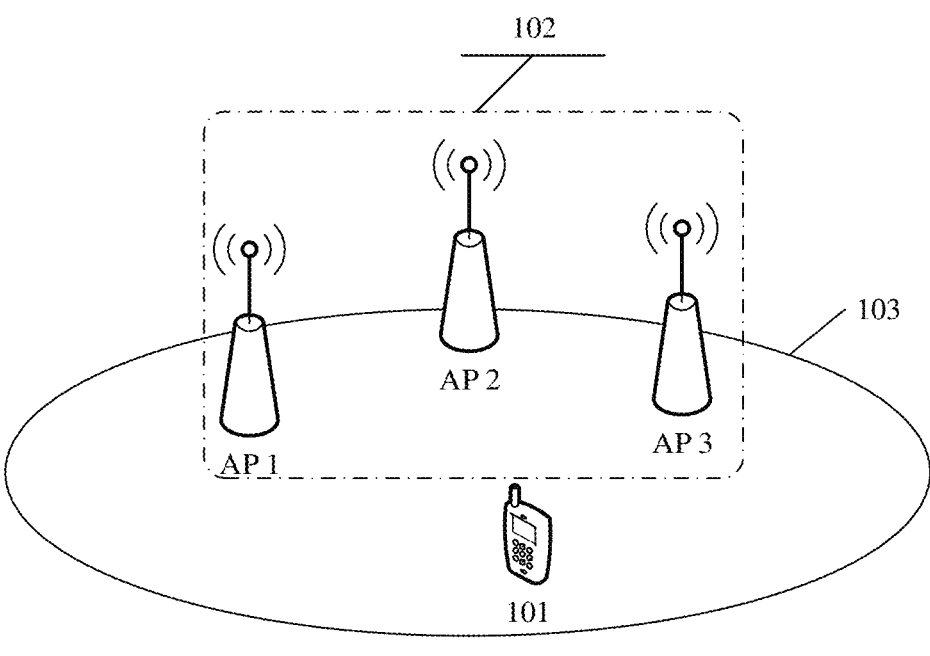
FIG. 1 is a schematic diagram of an application scenario to which an embodiment of this application is applicable.

To make the objectives, technical solutions, and advantages of the embodiments of this application clearer, the following clearly and thoroughly describes the technical solutions of this application with reference to the accompanying drawings in the embodiments of this application. Apparently, the described embodiments are some but not all of the embodiments of the technical solutions of this application. All other embodiments obtained by a person of ordinary skill in the art based on the embodiments described in this application document without creative efforts shall fall within the protection scope of the technical solutions of this application.

In the specification, claims, and accompanying drawings of this application, the terms "first" and "second" are used to distinguish between different objects, and not intended to describe a specific order. In addition, the term "include" and any other variant thereof are intended to cover non-exclusive protection. For example, a process, method, system, product, or device that includes a list of steps or units is not limited to the listed steps or units, but optionally includes steps or units not listed, or optionally includes other steps or units inherent to the process, method, system, product, or device. The term "a plurality of" in this application may mean at least two, for example, two, three, or more. However, the embodiments of this application are not limited thereto.

In addition, the term "and/or" in this specification describes only an association relationship for describing associated objects and represents that three relationships may exist. For example, A and/or B may represent the following three cases: Only A exists, both A and B exist, and only B exists. In addition, unless otherwise specified, the character "/" in this specification usually indicates an "or" relationship between associated objects.

Currently, an intelligent roaming mode is used to guide a terminal device to roam, mainly by configuring, on an AP side, a threshold that triggers the terminal device to roam. When an AP detects that a parameter (for example, a signal-to-noise ratio or a communication rate) of the terminal device is lower than the threshold, the AP may actively send a disassociation message to the terminal device, so that the terminal device is associated with an AP with higher signal quality and a higher communication rate.

However, terminal devices of different types, or even different terminal devices of the same type, may have different network communication capabilities. Therefore, in the foregoing triggering process, thresholds for triggering roaming of the terminal devices of different types or even different terminal devices of the same type are different. If a threshold setting is used to guide the terminal devices to roam, the threshold setting is critical. A process of determining a fixed threshold is relatively simple, but a roaming effect is poor. If the threshold is variable, the determining process is more complex. Therefore, the method of setting a threshold to guide a terminal device to roam has lower applicability.

First, technical terms used in exemplary embodiments of this application are described to facilitate understanding by a person skilled in the art.

(1) Cold start means that a terminal can reuse a roaming policy of a terminal of the same type and that a new AP network environment can reuse a roaming policy of a terminal associated with a similar network environment.

(2) A State Action Reward State Action (SARSA) algorithm is an algorithm for learning a policy in a Markov decision process. It is usually applied in the fields of machine learning and reinforcement learning. The algorithm updates a current action (or policy) by updating a value function (such as a Q-function), then generates a new state and reward based on a new action (or policy), and then updates the value function. This iterative process continues until both the value function and the policy converge to meet an expected requirement.

(3) Greedy Algorithm, when solving a problem, always makes the best choice at the time point. In other words, without considering an overall optimal solution, the algorithm obtains a locally optimal solution in a sense.

(4) Received Signal Strength Indicator (RSSI): It is generally used to indicate wireless signal strength, and refers to signal strength of a wireless signal when the wireless signal is received. The RSSI is related to transmit power of a wireless module, a design of an RF front end, and a gain of an antenna.

The following briefly describes application scenarios to which the technical solutions in the embodiments of this application can be applied. It should be noted that the application scenarios described below are for illustrative purposes only and are not intended to limit the embodiments of this application. In specific implementation, the technical solutions provided in the embodiments of this application can be applied flexibly based on actual requirements.

FIG. 1 is a schematic diagram of an application scenario to which an embodiment of this application is applicable. As shown in the figure, the scenario includes a target terminal 101 and an AP end 102. The AP end 102 includes three APs (AP 1, AP 2, and AP 3). It should be noted that a quantity of APs on the AP end 102 is not limited. FIG. 1 is described with only three APs.

The AP end 102 with three APs constitutes an AP network environment 103. When the target terminal 101 enters the AP network environment 103, the AP end 102 can assign a matched first target roaming policy to the target terminal 101. In a roaming process, if the AP end 102 evaluates that roaming of the target terminal 101 based on the first target roaming policy does not meet an expected requirement, a policy parameter in the first target roaming policy can be adjusted in real time until the expected requirement is met, and then the target terminal 101 is guided to roam to a target AP (for example, the AP 1 in FIG. 1) in the AP network environment 103 based on a second target roaming policy obtained through the adjustment, so that the AP 1 can provide network services for the connected target terminal 101. The network services may include, for example, channels (resources) and Wireless Fidelity (Wi-Fi) signals and so on.

The target terminal 101 may be an electronic device such as a mobile phone, a smart wearable device, a tablet computer, or a notebook. In addition, a related client may be installed on the target terminal 101, and the client may be software, for example, an application (APP), a browser, or short video software, or may be a web page, an applet, or the like.

In this embodiment of this application, a network profile library can be constructed in advance. The network profile library can be configured to store AP network profiles of various AP network environments, and can be configured to implement fast cold start after similarity comparison is performed based on the network profile library during subsequent construction of a new AP network environment. Specifically, this embodiment of this application can be as follows: Network information of N APs in the AP network environment (for example, network information of the AP 1, the AP 2, and the AP 3 in FIG. 1) is obtained. Network environment characteristics of the AP network environment (for example, the AP network environment 103 in FIG. 1) are determined based on the network information of the three APs (which may include one or more of coverage information, distribution information, drop-point areas, mutual scanning information, and the like of each AP). An AP network profile of the AP network environment is constructed based on the network environment characteristics of the AP network environment including the three APs, and is stored in the network profile library. In other words, the network profile library is determined based on environment characteristics of various AP network profiles, and includes network profiles in a plurality of AP network environments. The AP network profile is used to represent the network environment characteristics of the AP network environment.

In an embodiment, network environment characteristics of the N APs may be determined by considering the following aspects.

Aspect 1: The network environment characteristics of the AP network environment are determined based on coverage information in the network information of the N APs. The coverage information may include coverage of each AP in the AP network environment. Based on the coverage information, points where signal coverage is insufficient in the AP network environment (for example, the AP network environment 103 in FIG. 1) may be marked, to avoid impact on a roaming effect due to insufficient signal coverage in the roaming process.

Aspect 2: The network environment characteristics of the AP network environment are determined based on distribution information in the network information of the N APs. The distribution information is used to represent a specific location of each AP in the AP network environment, to improve accuracy of roaming in the subsequent roaming process.

Aspect 3: The network environment characteristics of the AP network environment are determined based on drop-point areas in the network information of the N APs. The drop-point areas are used to represent areas where signal drops occur in the AP network environment. For the drop-point areas, corresponding processing can be performed to avoid impact of a signal drop on the roaming effect in the subsequent roaming process.

Aspect 4: The network environment characteristics of the AP network environment are determined based on mutual scanning information in the network information of the N APs. The mutual scanning information is used to represent each AP in the AP network environment. For example, each AP in the AP network environment can be distinguished by an AP identity or signal strength (such as an RSSI). The mutual scanning information is used to represent obtained information related to a peer AP (such as an AP identity or received signal strength) that each AP can determine based on information received from the peer AP.

It should be noted that construction of the AP network profiles of various AP network environments can be implemented according to one or more of the foregoing aspects. A specific combination is not limited. The foregoing aspects 1 to 4 are only examples. In an actual roaming process, AP network profiles can also be constructed according to characteristics of other aspects.

In an embodiment, an implementation of fast cold start based on the network profile library during construction of the new AP network environment may specifically include the following steps:

obtaining mutual scanning information of M APs in the new AP network environment, where M is an integer greater than 0; ranking the M APs by importance based on the mutual scanning information of the M APs; constructing a mutual scanning matrix of the new AP network environment based on mutual scanning signal strength values of the M APs in the importance ranking, where for example, a quantity of rows of the mutual scanning matrix represents a quantity of APs in the network environment, a quantity of columns represents a quantity of APs scanned (receivable), a matrix element may be received signal strength of an AP, a signal strength value may represent a perceived distance between APs, and usually, the closer the two APs, the greater the signal strength value; generating a new AP network profile of the new AP network environment based on the mutual scanning matrix of the new AP network environment; and if the new AP network profile of the new AP network environment meets a similarity requirement with the AP network profile of the AP network environment (for example, the AP network environment 103 in FIG. 1) in the network profile library, reusing a terminal profile library in the AP network environment 103 for the new AP network environment, thereby implementing fast cold start; or if none of the new AP network profile of the new AP network environment and the AP network profiles of the AP network environments in the network profile library meets a similarity requirement, adding the new AP network profile to the network profile library.

In an embodiment, determining whether the new AP network profile of the new network environment meets the similarity requirement with the AP network profile of the AP network environment in the network profile library includes:

determining a similarity between the mutual scanning matrix of the new AP network environment and a mutual scanning matrix of a first AP network environment in the network profile library; and when the similarity meets a preset requirement, determining that the new AP network profile of the new network environment meets the similarity requirement with the AP network profile of the AP network environment in the network profile library.

In an embodiment, the similarity may be a cosine similarity (a value range may be 0 to 1, and the larger the value, the higher the similarity), a Euclidean distance (the shorter the distance, the higher the similarity), or a Jaccard similarity (a value range may be 0 to 1, and the larger the value, the higher the similarity). Correspondingly, the similarity requirement may be that the similarity is less than a preset threshold specified based on an actual requirement.

The similarity requirement may also be that a clustering algorithm can be used to find a cluster center closest to the mutual scanning matrix of the new AP network environment. When the closest cluster center is found, a Euclidean distance between the cluster center and the mutual scanning matrix of the new network environment meets the preset requirement (for example, it may be less than 0.5). In this case, the AP network profile of the AP network environment in the network profile library meets the similarity requirement.

In an embodiment, the M APs are ranked by importance. The importance ranking may be based on the mutual scanning signal strength values of the M APs, and an AP with a larger mutual scanning signal strength value is more important; or the importance ranking may be based on frequencies of the M APs, and an AP with a higher frequency is more important.

In an embodiment, the generating the new AP network profile of the new AP network environment based on the mutual scanning matrix of the new AP network environment may be: using a characteristic training model to extract network environment characteristics of the new AP network environment based on the mutual scanning matrix of the new AP network environment, and generating the new AP network profile of the new AP network environment based on the network environment characteristics of the new AP network environment.

Various AP network environments can be summarized and distinguished by constructing the foregoing network profile library. When the new AP network environment is subsequently constructed, a roaming policy of a similar AP network environment can be reused based on the network profile library. Therefore, a process of redefining a roaming policy can be omitted, roaming efficiency of the terminal can be improved, and roaming experience can be optimized.

In an embodiment of this application, a terminal profile library may also be configured for the constructed AP network environment (for example, a terminal profile library may be configured for the AP end 102 in FIG. 1). The terminal profile library includes roaming policies of at least one type of terminal in the N APs. For example, a type-A terminal includes at least three roaming policies for the AP 1, the AP 2, and the AP 3 respectively. Similarly, a type-B terminal may also include at least three roaming policies for the AP 1, the AP 2, and the AP 3 respectively, and a type-C terminal may also include at least three roaming policies for the AP 1, the AP 2, and the AP 3 respectively. The terminal types may be classified based on one or more combinations of hardware specifications such as a brand, a category, and a model.

In some embodiments, roaming policies of various types of terminals in the N APs may be distinguished by terminal profiles. A terminal profile may carry a network communication capability (for example, an RSSI) of the terminal during roaming, a terminal name, a terminal identity, a terminal type, and roaming policies respectively used by the terminal when the terminal roams between the N APs. The terminal profile library can assist an AP in providing roaming guidance for the terminal. For example, after the target terminal goes online, if a terminal profile in the terminal profile library matches the target terminal, the target terminal can be guided to roam based on the matched terminal profile.

It should be noted that specific representation forms of the foregoing network profile library and terminal profile library are not limited in the embodiments of this application.

To further describe the technical solutions provided in the embodiments of this application, detailed descriptions are provided below with reference to the accompanying drawings and specific implementations. Although the embodiments of this application provide the method operation steps shown in the following embodiments or accompanying drawings, the method may include more or fewer operation steps based on conventional techniques or without creative efforts. In steps without a necessary causal relationship logically, an execution order of the steps is not limited to an execution order provided in the embodiments of this application. During actual processing or when performed by an apparatus, the method may be performed according to the order shown in the embodiments or accompanying drawings or performed in parallel.

Figure 2:
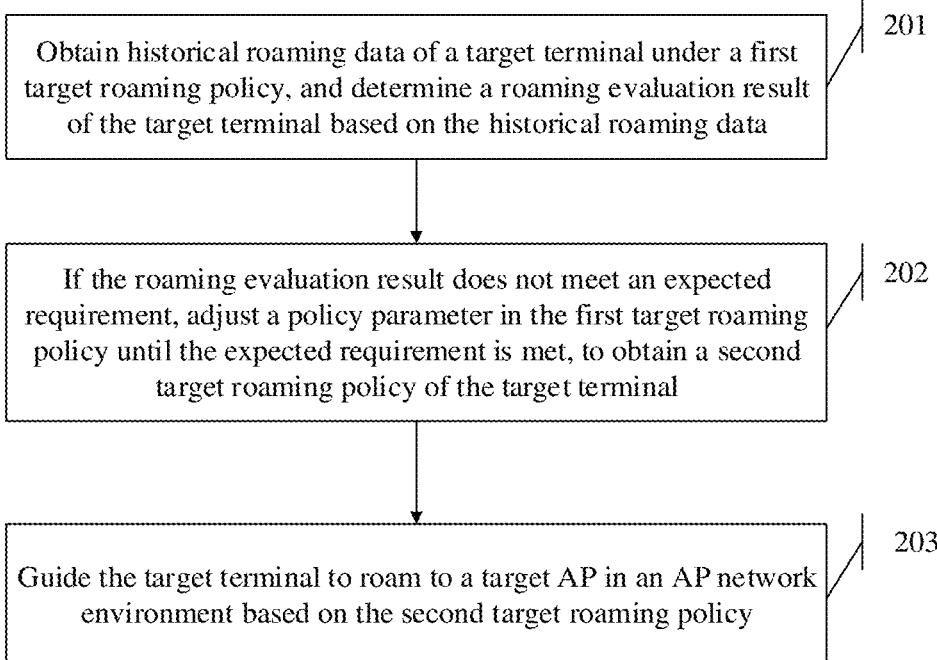
FIG. 2 is a flowchart of a terminal roaming guidance method according to an embodiment of this application.

FIG. 2 is a flowchart of a terminal roaming guidance method according to an embodiment of this application. The procedure may be performed by a terminal roaming guidance apparatus. The apparatus may be implemented by software, hardware, or a combination of software and hardware. As shown in FIG. 2, the procedure includes the following steps.

Step 201: Obtain historical roaming data of a target terminal under a first target roaming policy, and determine a roaming evaluation result of the target terminal based on the historical roaming data.

The first target roaming policy may be a roaming policy initially assigned when the target terminal (for example, the target terminal 101 in FIG. 1) enters an AP network environment.

In an embodiment, a terminal type of the target terminal can be identified, and the first target roaming policy is assigned to the target terminal based on the terminal type of the target terminal and the terminal profile library configured above.

In an embodiment, the terminal type of the target terminal may be identified by identifying a media access control (MAC) address; or the terminal type of the target terminal may be identified by a communication request initiated by the target terminal (for example, a hypertext transfer protocol (HTTP) communication request, or a communication request frame); or the terminal type of the target terminal may be identified by attribute information of the target terminal (information used to represent physical attributes of terminal and/or attributes of a terminal user, for example, user information, online behavior information, or online device information). This is not limited in this embodiment of this application.

In an embodiment, that the first target roaming policy is assigned to the target terminal based on the terminal type of the target terminal and the terminal profile library configured above may mainly include the following two cases.

Case 1: If a first terminal matching the terminal type is found in the terminal profile library based on the terminal type of the target terminal, a roaming policy in a first AP that the first terminal is currently associated with among N APs is used as the first target roaming policy of the target terminal, so that the target terminal newly connected to the network can reuse the roaming policy of the terminal of the same type (referred to as cold start), thereby increasing a roaming speed. Using FIG. 1 above as an example, if the terminal type of the target terminal matches that of a type-A terminal, roaming policies of the type-A terminal respectively in the AP 1, the AP 2, and the AP 3 can be obtained from the terminal profile library. When it is determined that the first AP that the type-A terminal is currently associated with is the AP 1, the roaming policy of the type-A terminal in the AP 1 can be used as the first target roaming policy of the target terminal, thereby implementing fast cold start.

Case 2: If the first terminal matching the terminal type is not found, based on the terminal type of the target terminal, in the terminal profile library associated with each of the N APs, an initial roaming policy of the target terminal is determined based on mutual scanning information of the N APs in the AP network environment and roaming information of the target terminal (which may be the historical roaming data of the target terminal, such as received signal strength before and after roaming, roaming time, channel utilization, a quantity of uplink bytes, a quantity of downlink bytes, a packet loss rate, or a physical rate), and the initial roaming policy of the target terminal is used as the first target roaming policy of the target terminal.

In an embodiment, obtaining the historical roaming data of the target terminal under the first target roaming policy may be obtaining historical roaming data of the target terminal within a preset time period (for example, from 7 a.m. to 9 a.m. every day) under the first target roaming policy; or may be obtaining sufficient historical roaming data (which may meet a preset quantity of pieces) of the target terminal under the first target roaming policy; or may be obtaining all pieces of historical roaming data of the target terminal under the first target roaming policy. This is not limited in this embodiment of this application.

In an embodiment, determining the roaming evaluation result of the target terminal based on the historical roaming data may be specifically: performing roaming evaluation based on at least one piece of the historical roaming data of the target terminal under the first target roaming policy, such as signal strength, an uplink physical rate, a downlink physical rate, a quantity of uplink bytes, a quantity of downlink bytes, or a packet loss rate, to obtain the roaming evaluation result of the target terminal. The process of performing roaming evaluation is to determine communication performance of the target terminal by comparing the historical roaming data before and after the target terminal executes the first target roaming policy. If the communication performance after roaming is degraded, it indicates that the roaming evaluation result of the target terminal does not meet an expected requirement. If the communication performance after roaming is improved, it can be further determined whether a specified threshold is met. If the specified threshold is met, the expected requirement is met. The uplink physical rate refers to a rate at which the target terminal sends data. The downlink physical rate refers to a rate at which the target terminal receives data. The quantity of uplink bytes refers to a quantity of bytes sent by the target terminal within a unit time. The quantity of downlink bytes refers to a quantity of bytes received by the target terminal within a unit time. For example, if the downlink physical rate after roaming is reduced, it is determined that the communication performance after roaming is degraded.

Step 202: If the roaming evaluation result does not meet the expected requirement, adjust a policy parameter in the first target roaming policy until the expected requirement is met, to obtain a second target roaming policy of the target terminal.

In an embodiment, the roaming evaluation result may be a result obtained based on one piece of the foregoing historical roaming data, or may be a result obtained based on a plurality of pieces of the foregoing historical roaming data. This is not limited in this embodiment of this application.

In an embodiment, the expected requirement is used to represent an optimal occasion for the target terminal to execute an optimal roaming policy.

For example, using the signal strength as an example, if the signal strength is evaluated to be lower than a specified signal strength threshold based on the signal strength, it indicates that the target terminal using the first target roaming policy does not meet the specified expected requirement. In this case, the policy parameter in the first target roaming policy is adjusted until the expected requirement is met, and the second target roaming policy of the target terminal is obtained. If the signal strength is not lower than the specified signal strength threshold, it indicates that the target terminal using the first target roaming policy can meet the expected requirement, and the target terminal is guided to roam to a target AP in the AP network environment based on the first target roaming policy.

Using the uplink physical rate and the downlink physical rate as an example, if the uplink physical rate is evaluated to be lower than a rate threshold, and the downlink physical rate is also evaluated to be lower than a rate limit, it indicates that the target terminal using the first target roaming policy does not meet the specified expected requirement. In this case, the policy parameter in the first target roaming policy is adjusted until the expected requirement is met, and the second target roaming policy of the target terminal is obtained. Otherwise, it indicates that the target terminal using the first target roaming policy can meet the expected requirement, and the target terminal is guided to roam to the target AP in the AP network environment based on the first target roaming policy.

Using the signal strength, the packet loss rate, the uplink physical rate, and the downlink physical rate as an example, they are compared with respective specified thresholds. If any one thereof does not exceed a specified threshold, it indicates that the target terminal using the first target roaming policy does not meet the specified expected requirement. In this case, the policy parameter in the first target roaming policy is adjusted until the expected requirement is met, and the second target roaming policy of the target terminal is obtained. Otherwise, it indicates that the target terminal using the first target roaming policy can meet the expected requirement, and the target terminal is guided to roam to the target AP in the AP network environment based on the first target roaming policy.

Optionally, a SARSA algorithm may be used to adjust the policy parameter in the first target roaming policy until the expected requirement is met. The adjustment may be specifically as follows: based on a selected first roaming action performed by the target terminal in a current first roaming state (which may be a state when an expected reward does not meet the expected requirement), obtaining an expected reward (which may be the foregoing roaming evaluation result) and a second roaming state at a next time point; determining, based on a Q-function, a second roaming action to be performed by the target terminal in the second roaming state, for example, in Greedy Algorithm configured based on the Q-function, selecting a second roaming action in the second roaming state, and performing the second roaming action; and updating the Q-function based on the second roaming state, the second roaming action, and the expected reward until an updated Q-function meets the expected requirement (for example, when a Q-function value is maximal). The expected requirement may mean that the used policy parameter (such as roaming actions, which may include but are not limited to roaming out of an old AP, roaming into a new AP, and the like) are an optimal roaming occasion (for example, the signal strength and the physical rate are both optimal) for the target terminal to roam to the target AP, thereby maximizing a benefit when the target terminal roams to the target AP, that is, maximizing the Q-function value (benefit value). In this embodiment of this application, the Q-function represents the obtained benefit, that is, each state and a benefit value of each policy used in this state, which can be stored in a table, a matrix, or the like.

The Q-function meets the following expression:

$$Q(s, a) = Q(s, a) + \alpha(r + \gamma Q(s', a') - Q(s, a)),$$

where s is the first roaming state, a is the first roaming action, r is the expected reward, $\alpha$ is a specified learning rate, $\gamma$ is a specified discount rate, s' is the second roaming state, and a' is the second roaming action.

It should be noted that, in addition to the SARSA algorithm, other similar reinforcement learning algorithms may also be used to adjust the policy parameter in the roaming policy. This is not limited in this embodiment of this application.

Step 203: Guide the target terminal to roam to the target AP in the AP network environment based on the second target roaming policy.

Optionally, after the target terminal is guided to roam to the target AP in the AP network environment based on the second target roaming policy, the second target roaming policy can also be updated to the terminal profile library, so that when the target terminal enters the AP network environment again later, the target terminal can be directly guided to roam based on this policy, thereby implementing fast cold start and improving roaming experience.

In this embodiment of this application, because the historical roaming data of the target terminal under the first target roaming policy is obtained for analysis, and the first target roaming policy is the roaming policy assigned when the target terminal enters the AP network environment, it is determined whether the roaming of the target terminal using the first target roaming policy meets the expected requirement. If the expected requirement is not met, the policy parameter in the first target roaming policy is optimized, and then the target terminal is guided to roam. Therefore, compared with using a threshold to guide a terminal device to roam, differences between different terminal devices are taken into account, and roaming policies used for different terminal devices can be adaptively adjusted in the roaming process to maximize roaming benefits, thereby improving applicability of the terminal device during roaming.

Based on the same technical concept, an embodiment of this application further provides a terminal roaming guidance apparatus. The apparatus can implement the procedure of the terminal roaming guidance method in the foregoing embodiment of this application.

Figure 3:
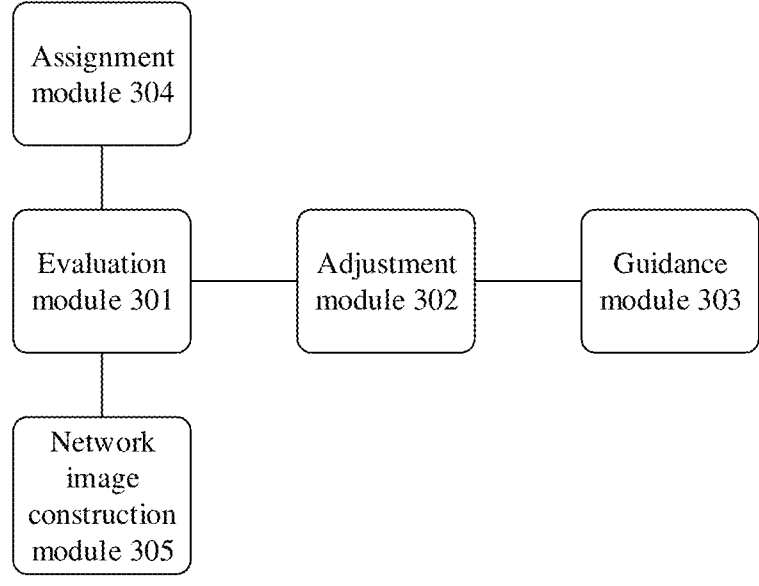
FIG. 3 is a schematic diagram of a structure of a terminal roaming guidance apparatus according to an embodiment of this application.

FIG. 3 is a schematic diagram of a structure of a terminal roaming guidance apparatus according to an embodiment of this application. As shown in FIG. 3, the apparatus includes an evaluation module 301, an adjustment module 302, and a guidance module 303. Further, the apparatus may further include an assignment module 304 and a network image construction module 305.

The evaluation module 301 is configured to obtain historical roaming data of a target terminal under a first target roaming policy, and determine a roaming evaluation result of the target terminal based on the historical roaming data.

The adjustment module 302 is configured to adjust, if the roaming evaluation result does not meet an expected requirement, a policy parameter in the first target roaming policy until the expected requirement is met, to obtain a second target roaming policy of the target terminal.

The guidance module 303 is configured to guide the target terminal to roam to a target AP in the AP network environment based on the second target roaming policy.

In an embodiment, the adjustment module 302 is specifically configured to:

based on a selected first roaming action performed by the target terminal in a current first roaming state, obtain an expected reward (which may be the foregoing roaming evaluation result) and a second roaming state at a next time point; determine, based on a Q-function, a second roaming action to be performed by the target terminal in the second roaming state; and update the Q-function based on the second roaming state, the second roaming action, and the expected reward until an updated Q-function meets the expected requirement, where the Q-function meets the following expression: $Q(s,a)=Q(s,a)+\alpha(r+\gamma Q(s',a')-Q(s,a))$, where s is the first roaming state, a is the first roaming action, r is the expected reward, $\alpha$ is a specified learning rate, $\gamma$ is a specified discount rate, s' is the second roaming state, and a' is the second roaming action.

In an embodiment, the AP network environment includes N APs and a terminal profile library, the terminal profile library includes a roaming policy of at least one type of terminal in the N APs, and N is an integer greater than 0; and the assignment module 304 is specifically configured to:

identify a terminal type of the target terminal; if a first terminal matching the terminal type is found in the terminal profile library based on the terminal type of the target terminal, use a roaming policy in a first AP that the first terminal is currently associated with among the N APs as the first target roaming policy of the target terminal; and if the first terminal matching the terminal type is not found in the terminal profile library based on the terminal type of the target terminal, determine an initial roaming policy of the target terminal based on mutual scanning information of the N APs in the AP network environment and roaming information of the target terminal, and use the initial roaming policy of the target terminal as the first target roaming policy of the target terminal.

In an embodiment, the network image construction module 305 is configured to: obtain network information of N APs in the AP network environment, where N is an integer greater than 0; determine network environment characteristics of the AP network environment based on the network information of the N APs; and construct an AP network profile of the AP network environment based on the network environment characteristics of the AP network environment, and store the AP network profile in a network profile library.

In an embodiment, the network image construction module 305 is specifically configured to:

determine the network environment characteristics of the AP network environment based on coverage information in the network information of the N APs; or determine the network environment characteristics of the AP network environment based on distribution information in the network information of the N APs; or determine the network environment characteristics of the AP network environment based on drop-point areas in the network information of the N APs.

In an embodiment, the network image construction module 305 is further configured to: obtain mutual scanning information of M APs in a new AP network environment, where M is an integer greater than 0; rank the M APs by importance based on the mutual scanning information of the M APs; construct a mutual scanning matrix of the new AP network environment based on mutual scanning signal strength values of the M APs in the importance ranking; generate a new AP network profile of the new AP network environment based on the mutual scanning matrix of the new AP network environment; and if the new AP network profile of the new AP network environment meets a similarity requirement with the AP network profile of the AP network environment in the network profile library, reuse the terminal profile library in the AP network environment for the new AP network environment.

It should be noted herein that the apparatus provided in this embodiment of this application can implement all method steps in the foregoing method embodiment, with the same technical effect achieved, and parts and beneficial effects of this embodiment same as those of the method embodiment are not described in detail herein.

Based on the same technical concept, an embodiment of this application further provides an electronic device. The electronic device can implement functions of the foregoing terminal roaming guidance apparatus.

Figure 4:
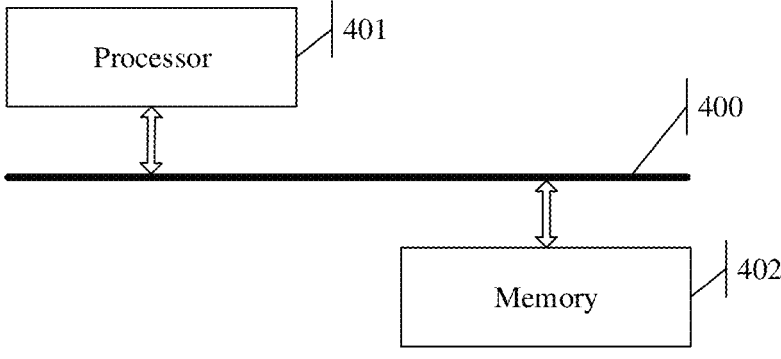
FIG. 4 is a schematic diagram of a structure of an electronic device according to an embodiment of this application.

FIG. 4 is a schematic diagram of a structure of an electronic device according to an embodiment of this application.

The electronic device includes at least one processor 401 and a memory 402 connected to the at least one processor 401. A specific connection medium between the processor 401 and the memory 402 is not limited in this embodiment of this application. FIG. 4 shows an example in which the processor 401 and the memory 402 are connected by a bus 400. The bus 400 in FIG. 4 is represented by a bold line. A connection manner between other components is only an example for description and is not limited. The bus 400 may be classified into an address bus, a data bus, a control bus, and the like. For ease of representation, only one bold line is used for representing the bus in FIG. 4, but this does not mean that there is only one bus or only one type of bus. Alternatively, the processor 401 may also be referred to as a controller, and the name is not limited.

In this embodiment of this application, the memory 402 stores instructions executable by the at least one processor 401. By executing the instructions stored in the memory 402, the at least one processor 401 can perform the terminal roaming guidance method discussed above. The processor 401 can implement functions of the modules in the apparatus shown in FIG. 3.

The processor 401 is a control center of the electronic device, can use various interfaces and lines to connect various parts of the entire electronic device, and execute various functions and data processing of the electronic device by running or executing the instructions stored in the memory 402 and invoking data stored in the memory 402, to perform overall monitoring on the apparatus.

In a possible design, the processor 401 may include one or more processing units. An application processor and a modem processor may be integrated in the processor 401. The application processor mainly processes an operating system, a user interface, an application program, and the like. The modem processor mainly processes wireless communication. It may be understood that the modem processor may alternatively be not integrated in the processor 401. In some embodiments, the processor 401 and the memory 402 may be implemented on a same chip. In some embodiments, the processor 401 and the memory 402 may also be implemented separately on separate chips.

The processor 401 may be a general-purpose processor, for example, a central processing unit (CPU), a digital signal processor, an application-specific integrated circuit, a field programmable gate array or another programmable logic device, a discrete gate or a transistor logic device, or a discrete hardware component, and may implement or perform the methods, steps, and logical block diagrams disclosed in the embodiments of this application. The general-purpose processor may be a microprocessor or any conventional processor or the like. Steps of the terminal roaming guidance method disclosed with reference to the embodiments of this application may be directly performed and completed by using a hardware processor, or may be performed and completed by using a combination of hardware in the processor and a software module.

As a non-volatile computer-readable storage medium, the memory 402 may be configured to store non-volatile software programs, non-volatile computer-executable programs, and modules. The memory 402 may include at least one type of storage medium, for example, may include a flash memory, a hard disk, a multimedia card, a memory card, a random access memory (Random Access Memory, RAM), a static random access memory (Static Random Access Memory, SRAM), a programmable read-only memory (Programmable Read Only Memory, PROM), a read-only memory (Read Only Memory, ROM), an electrically erasable programmable read-only memory (Electrically Erasable Programmable Read-Only Memory, EEPROM), a magnetic memory, a magnetic disk, an optical disc, or the like. The memory 402 is but not limited to any other medium that can be used to carry or store desired program code in a form of an instruction or a data structure and can be accessed by a computer. The memory 402 in the embodiments of this application may alternatively be a circuit or any other apparatus that can implement a storage function, and is configured to store program instructions and/or data.

Based on the design and programming of the processor 401, code corresponding to the terminal roaming guidance method described in the foregoing embodiment can be embedded into the chip, so that the chip can perform the terminal roaming guidance method in the embodiment shown in FIG. 2 during running. How to design and program the processor 401 is a technology known to a person skilled in the art, and details are not described herein.

It should be noted herein that the electronic device provided in this embodiment of this application can implement all method steps implemented in the foregoing method embodiment, with the same technical effect achieved, and parts and beneficial effects of this embodiment same as those of the method embodiment are not described in detail herein.

An embodiment of this application further provides a computer-readable storage medium. Computer-executable instructions are stored in the computer-readable storage medium. The computer-executable instructions are used to enable a computer to perform the terminal roaming guidance method in the foregoing embodiment.

An embodiment of this application further provides a computer program product. When the computer program product is invoked by a computer, the computer is enabled to perform the terminal roaming guidance method in the foregoing embodiment.

A person skilled in the art should understand that the embodiments of this application may be provided as a method, a system, or a computer program product. Therefore, this application may use a form of a hardware-only embodiment, a software-only embodiment, or an embodiment with a combination of software and hardware. In addition, this application may use a form of a computer program product implemented on one or more computer-usable storage media (including but not limited to a disk memory, a CD-ROM, an optical memory, and the like) that include computer-usable program code.

This application is described with reference to the flowcharts and/or the block diagrams of the method, the device (system), and the computer program product according to this application. It should be understood that computer program instructions may be used to implement each procedure and/or each block in the flowcharts and/or the block diagrams and a combination of a procedure and/or a block in the flowcharts and/or the block diagrams. These computer program instructions may be provided for a general-purpose computer, a dedicated computer, an embedded processor, or a processor of another programmable data processing device to generate a machine, so that the instructions executed by the computer or the processor of the other programmable data processing device generate an apparatus for implementing a specific function in one or more procedures in the flowcharts and/or in one or more blocks in the block diagrams.

These computer program instructions may alternatively be stored in a computer-readable memory that can instruct a computer or another programmable data processing device to work in a specific manner, so that the instructions stored in the computer-readable memory generate an artifact that includes an instruction apparatus. The instruction apparatus implements a specific function in one or more procedures in the flowcharts and/or in one or more blocks in the block diagrams.

Alternatively, these computer program instructions may be loaded onto a computer or another programmable data processing device, so that a series of operations and steps are performed on the computer or the another programmable device, to generate computer-implemented processing. Therefore, the instructions executed on the computer or the other programmable device provide steps for implementing a specific function in one or more procedures in the flow-charts and/or in one or more blocks in the block diagrams.

Although optional embodiments of this application have been described, a person skilled in the art can make additional changes and modifications to these embodiments once the basic inventive concept is learned. Therefore, the appended claims shall be construed to cover the optional embodiments and all changes and modifications falling within the scope of this application.

Apparently, a person skilled in the art may make various changes and variations to the embodiments of this application without departing from the spirit and scope of the embodiments of this application. Therefore, this application is intended to cover these modifications and variations of the embodiments of this application provided that they fall within the protection scope defined by the following claims and their equivalent technologies.

What is claimed is:

1. A terminal roaming guidance method, comprising:
    obtaining historical roaming data of a target terminal under a first target roaming policy, and determining a roaming evaluation result of the target terminal based on the historical roaming data, wherein the first target roaming policy is a roaming policy assigned based on a network profile library in a wireless access point AP network environment when the target terminal enters the AP network environment, wherein the network profile library is determined based on network environment characteristics of a plurality of various AP network profiles, and includes network profiles in the plurality of AP network environments;
    when the roaming evaluation result does not meet an expected requirement, adjusting a policy parameter in the first target roaming policy until the expected requirement is met, to obtain a second target roaming policy of the target terminal, wherein the expected requirement represents an optimal occasion for the target terminal to execute an optimal roaming policy; and
    guiding the target terminal to roam to a target AP in the AP network environment based on the second target roaming policy, wherein the target AP is a target AP in the second target roaming policy;
    wherein the AP network environment comprises N APs and is configured with a terminal profile library; and
    wherein the method further comprises:
        determining whether a first AP network profile that meets a similarity requirement with an AP network profile of the AP network environment exists in the network profile library; and
        when the first AP network profile exists, reusing the terminal profile library corresponding to the first AP network profile for the AP network environment;
    wherein the step of determining whether the first AP network profile that meets the similarity requirement with the AP network profile of the AP network environment exists in the network profile library comprises:
        determining a similarity between a mutual scanning matrix of the AP network environment and a mutual scanning matrix of a first AP network environment in the network profile library; and
        when the similarity meets a preset requirement, determining that the AP network profile of the AP network environment meets the similarity requirement with the first AP network profile of the first AP network environment in the network profile library.

2. The method according to claim 1, wherein the AP network environment comprises N APs and is configured with a terminal profile library, the terminal profile library comprises roaming policies of one or more types of terminals in the N APs, and N is an integer greater than 0; and
    before the obtaining the historical roaming data of the target terminal under the first target roaming policy, the method further comprises:
    determining a terminal type of the target terminal; and
    when a first terminal matching the terminal type is found in the terminal profile library based on the terminal type of the target terminal, using a roaming policy in a first AP that the first terminal is currently associated with among the N APs as the first target roaming policy of the target terminal.

3. The method according to claim 2, wherein the method further comprises:
    configuring the AP network environment with the terminal profile library.

4. The method according to claim 3, wherein the configuring the AP network environment with the terminal profile library comprises:
    determining whether a first network profile that meets a similarity requirement with an AP network profile of the AP network environment exists in the network profile library; and
    when the first network profile exists, reusing the terminal profile library corresponding to the first network profile for the AP network environment.

5. The method according to claim 2, wherein the method further comprises:
    when the first terminal matching the terminal type is not found in the terminal profile library based on the terminal type of the target terminal, determining an initial roaming policy of the target terminal based on mutual scanning information of the N APs in the AP network environment and roaming information of the target terminal, and using the initial roaming policy of the target terminal as the first target roaming policy of the target terminal, wherein
    the roaming information of the target terminal comprises one or more pieces of the following information: signal strength information, roaming time, channel utilization, a quantity of uplink bytes, a quantity of downlink bytes, a packet loss rate, or a physical rate.

6. The method according to claim 2, wherein a terminal profile of the terminal profile library comprises one or more pieces of the following information: a network communication capability of a terminal during roaming, a terminal name, a terminal identity, a terminal type, or roaming policies used when the terminal roams in the N APs respectively.

7. The method according to claim 2, wherein the determining the terminal type of the target terminal comprises one or more of the following:
    determining the terminal type of the target terminal by identifying a media access control address;
    determining the terminal type of the target terminal based on a hypertext transfer protocol HTTP communication request initiated by the target terminal; and
    determining the terminal type of the target terminal based on attribute information of the target terminal.

8. The method according to claim 2, wherein the terminal type is classified based on one or more combinations of hardware specifications.

9. The method according to claim 1, wherein the method further comprises:

obtaining network information of N APs in the AP network environment, wherein N is an integer greater than 0;

determining network environment characteristics of the AP network environment based on the network information of the N APs; and constructing an AP network profile of the AP network environment based on the network environment characteristics of the AP network environment, and storing the AP network profile in the network profile library.

10. The method according to claim 9, wherein the determining the network environment characteristics of the AP network environment based on the network information of the N APs comprises one or more of the following:

determining the network environment characteristics of the AP network environment based on coverage information in the network information of the N APs;

determining the network environment characteristics of the AP network environment based on distribution information in the network information of the N APs;

determining the network environment characteristics of the AP network environment based on drop-point areas in the network information of the N APs; and determining the network environment characteristics of the AP network environment based on mutual scanning information in the network information of the N APs.

11. The method according to claim 1, wherein the method further comprises:

obtaining mutual scanning information of M APs in a new AP network environment, wherein M is an integer greater than 0; ranking the M APs by importance based on the mutual scanning information of the M APs;

constructing a mutual scanning matrix of the new AP network environment based on mutual scanning signal strength values of the M APs in the importance ranking;

generating a new AP network profile of the new AP network environment based on the mutual scanning matrix of the new AP network environment; and when the new AP network profile of the new AP network environment meets a similarity requirement with the AP network profile of the AP network environment in the network profile library, reusing the terminal profile library in the AP network environment for the new AP network environment.

12. The method according to claim 11, wherein the method further comprises:

when the new AP network profile of the new AP network environment does not meet the similarity requirement with the AP network profile in the network profile library, adding the new AP network profile to the network profile library.

13. The method according to claim 11, wherein the ranking the M APs by importance based on the mutual scanning information of the M APs comprises:

performing the importance ranking based on the mutual scanning signal strength values of the M APs, wherein the greater a mutual scanning signal strength value, the higher the importance; or performing the importance ranking based on frequencies of the M APs, wherein the higher a frequency, the higher the importance.

14. The method according to claim 1, wherein the obtaining the historical roaming data of the target terminal under the first target roaming policy comprises:

obtaining historical roaming data of the target terminal within a preset time period under the first target roaming policy;

obtaining a preset quantity of pieces of historical roaming data of the target terminal under the first target roaming policy; or obtaining all pieces of historical roaming data of the target terminal under the first target roaming policy.

15. The method according to claim 1, wherein the historical roaming data comprises one or more of the following: signal strength, an uplink physical rate, a downlink physical rate, a quantity of uplink bytes, a quantity of downlink bytes, and a packet loss rate of the target terminal under the first target roaming policy; and the determining the roaming evaluation result of the target terminal based on the historical roaming data comprises:

determining, based on historical roaming data before and after the target terminal executes the first target roaming policy, whether communication performance of the target terminal meets a specified expected requirement, wherein the expected requirement represents suitability of a roaming behavior of the target terminal.

16. The method according to claim 15, wherein the determining whether the communication performance of the target terminal meets the specified expected requirement comprises:

when one piece of the historical roaming data does not meet a corresponding specified threshold, determining that the communication performance of the target terminal does not meet the specified expected requirement after the target terminal roams by using the first target roaming policy.

17. The method according to claim 1, wherein the adjusting the policy parameter in the first target roaming policy until the expected requirement is met comprises:

based on a selected first roaming action performed by the target terminal in a current first roaming state, obtaining an expected reward and a second roaming state at a next time point;

determining, based on a Q-function, a second roaming action to be performed by the target terminal in the second roaming state; and updating the Q-function based on the second roaming state, the second roaming action, and the expected reward until an updated Q-function meets the expected requirement, wherein the Q-function meets the following expression: $Q(s,a)=Q(s,a)+\alpha(r+\gamma Q(s',a')-Q(s,a))$, wherein s is the first roaming state, a is the first roaming action, r is the expected reward, $\alpha$ is a specified learning rate, $\gamma$ is a specified discount rate, s' is the second roaming state, and a' is the second roaming action.

18. An electronic device, comprising:

a memory, configured to store a computer program; and a processor, configured to execute the computer program stored in the memory, to implement the steps of the method according to claim 1.

19. A non-transitory computer-readable storage medium, wherein a computer program is stored in the computer-readable storage medium, and when the computer program is executed by a processor, the steps of the method according to claim 1 are implemented.

20. A terminal roaming guidance method, comprising:

obtaining historical roaming data of a target terminal under a first target roaming policy, and determining a roaming evaluation result of the target terminal based on the historical roaming data, wherein the first target roaming policy is a roaming policy assigned based on a network profile library in a wireless access point AP network environment when the target terminal enters the AP network environment; wherein the network profile library is determined based on environment characteristics of various AP network profiles, and includes network profiles in a plurality of AP network environments;

when the roaming evaluation result does not meet an expected requirement, adjusting a policy parameter in the first target roaming policy until the expected requirement is met, to obtain a second target roaming policy of the target terminal, wherein the expected requirement represents an optimal occasion for the target terminal to execute an optimal roaming policy;

guiding the target terminal to roam to a target AP in the AP network environment based on the second target roaming policy, wherein the target AP is a target AP in the second target roaming policy; and wherein the adjusting the policy parameter in the first target roaming policy until the expected requirement is met comprises:

based on a selected first roaming action performed by the target terminal in a current first roaming state, obtaining an expected reward and a second roaming state at a next time point;

determining, based on a Q-function, a second roaming action to be performed by the target terminal in the second roaming state; and updating the Q-function based on the second roaming state, the second roaming action, and the expected reward until an updated Q-function meets the expected requirement, wherein the Q-function meets the following expression: $Q(s,a)=Q(s,a)+\alpha(r+\gamma Q(s',a')-Q(s,a))$, wherein s is the first roaming state, a is the first roaming action, r is the expected reward, $\alpha$ is a specified learning rate, $\gamma$ is a specified discount rate, s' is the second roaming state, and a' is the second roaming action.

* * * * *